Patented July 3, 1951

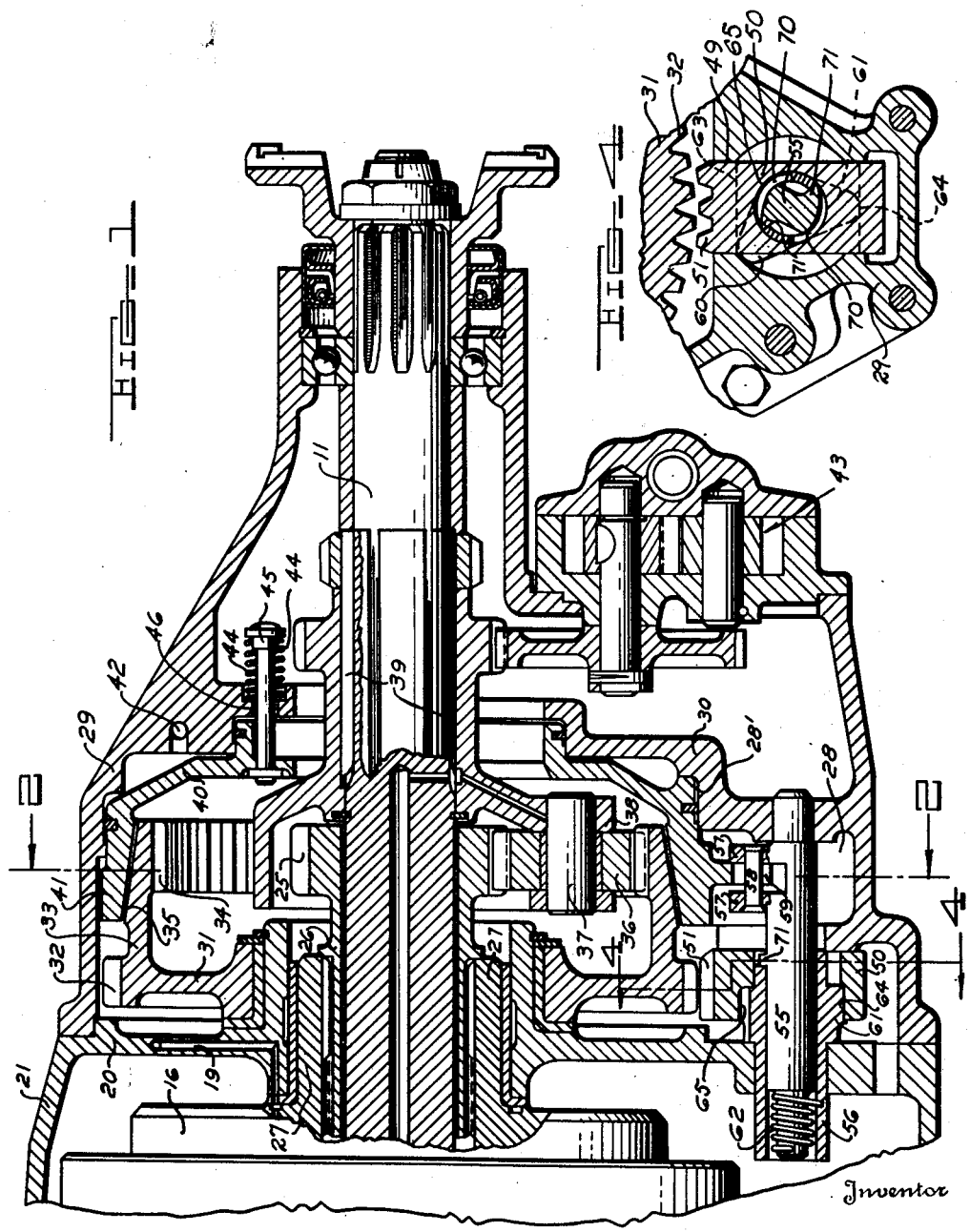

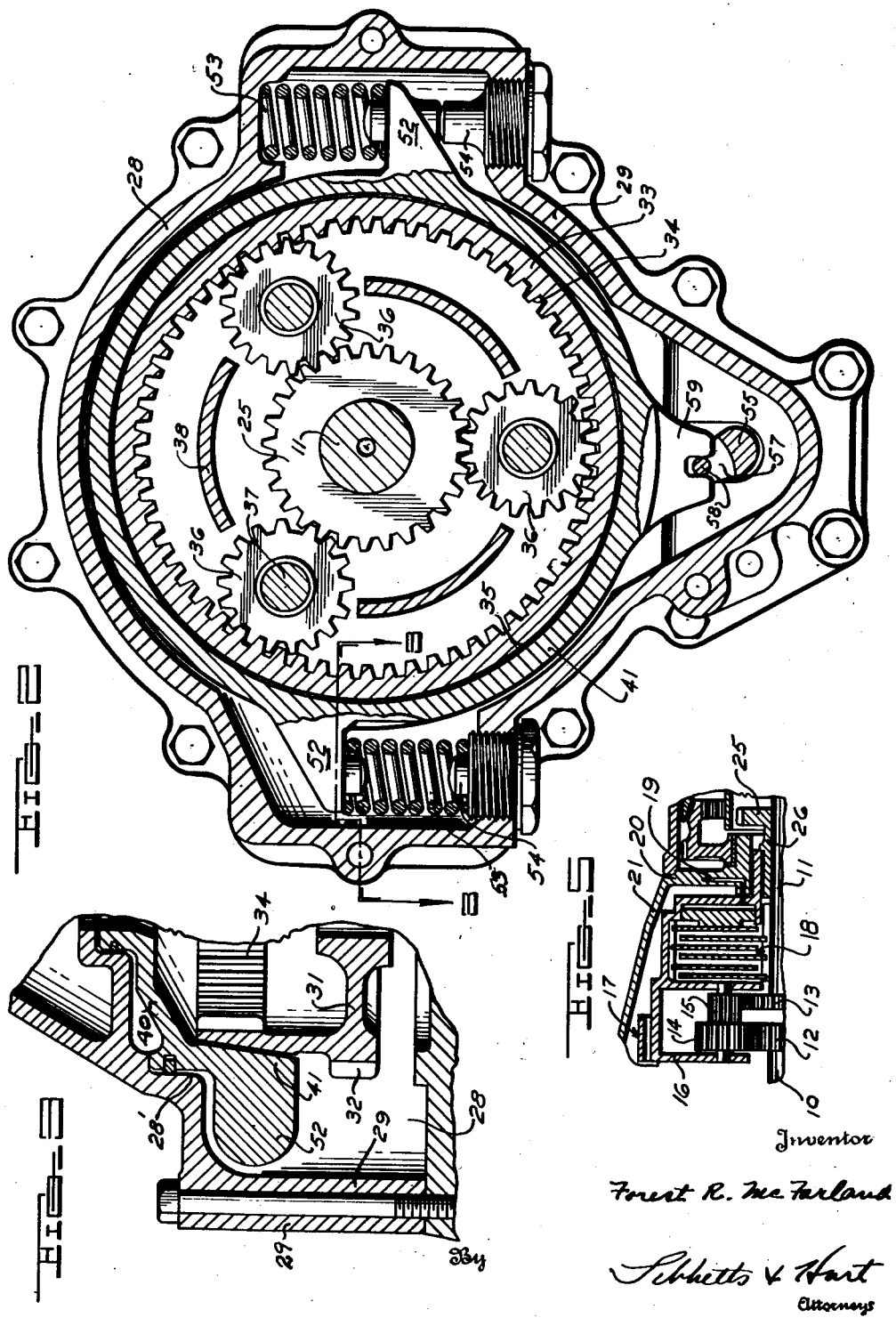

2,559,128

UNITED STATES PATENT OFFICE 2,559,128

TRANSMISSION

Forest R. McFarland, Huntington Woods, Mich., assignor to Packard Motor Car Company, Detroit, Mich., a corporation of Michigan Application January 30, 1946, Serial No. 644,319

9 Claims. (Cl. 74—785)

This invention relates to transmissions and more particularly to reverse drive mechanism.

An object of the invention is to provide a transmission in which reverse drive may be smoothly established with minimum effort on the part of the operator.

Another object of the invention is to provide a reverse drive mechanism in which the drive is initially established by a friction medium that is overruled by a positive medium upon a predetermined increase in torque.

Another object of the invention is to provide friction and positive reverse drive effecting means interrelated in a manner such that the friction means will apply the positive means upon excessive torque development.

Still another object of the invention is to provide a reverse drive mechanism in which a power actuated friction device establishes initial drive and energizes means to shift a pawl for establishing positive drive above a predetermined torque load.

Another object of the invention is to provide a transmission in which forward and reverse drives flow in separate paths from planetary gearing to a driven shaft.

Other objects of the invention will appear from the following description taken in connection with the drawing, which forms a part of this specification, and in which:

Fig. 1 is a longitudinal sectional view of a portion of a transmission showing reverse drive mechanism;

Fig. 2 is a sectional view of the same taken on line 2—2 of Fig. 1;

Fig. 3 is a fragmentary sectional view of the friction brake mechanism taken on line 3—3 of Fig. 2;

Fig. 4 is a fragmentary sectional view of the pawl brake and cam actuator means taken on line 4—4 of Fig. 1; and Fig. 5 is a longitudinal fragmentary sectional view of the transmission in advance of the reverse drive mechanism.

Referring to the Fig. 5 of the drawings, power drive shaft 10 and driven shaft 11 are arranged in axial alignment and are interconnected by primary planetary gearing. Such gearing comprises gear 12 fixed on shaft 10, gear 13 fixed on shaft 11, a planet unit comprising gear 14 meshing with gear 12 and gear 15 meshing with gear 13, and a carrier 16 on which the planet unit is rotatably mounted. Low forward speed is obtained by applying brake 17 to the carrier to prevent its reverse rotation and direct forward drive is obtained by engaging clutch 18 locking the carrier to the driven shaft and thereby causing the planetary gearing unit and the shafts to rotate together as a unit. The brake may be applied in any suitable manner and a controlled pressure fluid medium flowing through passage 19 in a wall 20 of transmission casing 21 may be employed for engaging the clutch. Such planetary gearing and the controls are conventional.

Reverse drive mechanism is shown associated with the carrier and driven shaft and includes a secondary speed reduction planetary gearing. In such planetary gearing drive gear 25 is connected to rotate with carrier 16 and is preferably found on sleeve 26 that is splined to an extension 27 of carrier 16. The driven shaft 11 and sleeve 26 are concentric and extend through and are supported by wall 20 from which they project into a chamber 28 formed by casing section 29 having a transversely extending wall 30. A freely mounted abutment ring gear 31 is mounted in chamber 28 and has external teeth 32 and a rim extension 33 formed with internal teeth 34 and an external cone friction brake portion 35. Planet gears 36 mesh with drive gear 25 and the internal teeth 34 of the abutment gear and are rotatably mounted on pins 37 fixed to carrier 38 splined at 39 to the driven shaft 11.

Gear 25, being fixed to carrier 16, will be held stationary in low forward speed and will rotate with the carrier in high forward speed and so long as ring gear 31 is free there will be no drive transmitted through the reverse drive mechanism. Two brake means are provided for holding the ring gear stationary to establish reverse drive and one of such means is dependent upon the other for its actuation. The primary brake means comprises a brake drum member 40 having a cone rim 41 telescoping the brake rim 35 of the ring gear and adapted to be frictionally engaged therewith to establish reverse drive. This primary brake member is axially slidable in a cylinder 28' in chamber 28 and is preferably engaged by pressure fluid under operator control. The pressure fluid system may be conventional and includes passage 42 in wall 30 and a pump similar to that indicated by numeral 43 but preferably driven by shaft 10. Brake member 40 is normally disengaged by springs 44 engaged with wall 30 and the heads of studs 45 that extend through arcuate slots 46 in the wall 30 and are fixed to the brake member.

The other or secondary brake means for holding ring gear 31 stationary is of the positive type.

Such brake means is shown as a pawl 50 slidably mounted in a guideway 49 in casing section 29 and having teeth 51 adapted to be meshed with the external teeth 32 of the ring gear. The pawl is operated by camming means actuated by the friction brake member when torque reaches a magnitude causing rotation thereof. As shown in Fig. 2 the friction brake member is mounted for limited rotative movement, but such movement is opposed by springs 53 arranged between ears 52 and casing 29. Members 54 secured to casing 29 serve as abutments for the ears 52 thereby limiting the rotational movement of the friction brake member.

The camming means for the positive brake pawl includes a cylindrical rotatably mounted member 55 having spaced ears 57 supporting a pin 58. The pin is straddled by a yoke 59 on the friction brake member and serves to rotate the member therewith when the friction brake member moves rotationally in response to torque conditions. The space between ears 57 is adequate to allow the yoke 59 to shift freely on pin 58 within the range of axial movement of the friction brake member. This cylindrical member 55 is telescoped at one end by sleeve 56 having two cams 60 and 61 formed thereon. Member 55 and sleeve 56 are connected by flexible drive means in the form of a coil spring 62. Member 55 is rotatably mounted at one end in wall 30 and sleeve 56 is rotatably mounted in wall 20. The pawl 50 has an opening 65 through which member 55 projects and in which cams 60 and 61 are disposed to engage pawl walls 63 and 64. The arrangement of the two cams is such that they will be operative one at a time, that is when one is effective the other is ineffective. The end of sleeve 56 is formed with slots 70 for receiving lugs 71 formed on member 55.

To establish reverse drive through the secondary planetary gearing, brake 17 and clutch 18 are released and brake drum 40 is moved axially to frictionally engage the brake surface 35 on the reaction gear 31. Release of brake 17 and clutch 18 will cause carrier 16 to be driven reversely and as gear 25 rotates in unison therewith braking of the reaction gear will cause carrier 38 to be driven reversely at a reduced speed through planet gears 36. This drive will be maintained so long as the torque requirement does not cause reverse rotation of brake drum 40. When this occurs the camming means becomes effective to engage the pawl 50 with the gear 31 so that it is held positively instead of frictionally. Reverse rotation of brake drum 40 will rotate member 55 therewith through the yoke and pin connection and spring 62 will be energized to rotate camshaft 56 to swing cam 60 against wall surface 63 thereby shifting the pawl so that its teeth 51 mesh with teeth 32 on the reaction gear. During this rotation of member 55, the lugs 71 move freely in slots 70 and in the event the pawl teeth abut the gear teeth the spring will be wound up sufficiently to further rotate the camshaft and move the pawl into meshed relation with the gear 31 upon rotation thereof away from tooth abutting relation. It will be understood that springs 53 are compressed by rotation of the brake drum and while energized serve to urge the brake drum and camming means back to pawl disengaging position, the position shown in the drawings. As member 55 is rocked in an anti-clockwise direction, as shown in Fig. 4, upon pawl disengaging rotation of the camming means, lugs 71 will bear against the camshaft at the ends of the slots and will positively rotate the camshaft to engage cam 61 with pawl wall 64 and release cam 60 from wall 63 thereby carrying the pawl out of engagement with gear 31 whereupon the frictional braking of gear 31 again becomes effective. When pressure fluid to chamber 28' is cut off, springs 44 will act against studs 45 to move the brake drum 40 away from engagement with gear 31 so that it will no longer serve as a reaction member.

It will be understood that various forms of the invention other than those described above may be used without departing from the spirit or scope of the invention.

What I claim is:

1. In a power transmitting mechanism, gearing including a freely mounted reaction gear adapted to be held stationary to establish a drive through the mechanism, means for frictionally braking the reaction gear, means for positively braking the reaction gear, and camming means operated by the friction braking means for actuating the positive braking means.

2. In a power transmitting mechanism, planetary gearing including a reaction gear, friction means having limited rotative movement and slidable to engage said reaction gear to establish drive through the mechanism, positive brake means for the reaction gear, and camming means responsive to rotational movement of said friction brake means for actuating said positive brake means.

3. In a reverse drive mechanism, planetary speed reduction gearing including a reaction gear, friction brake means operable to engage said gear and mounted for limited rotational movement, a slidable pawl for engaging and positively braking said reaction gear, a rotatable member connected for rotation with the friction brake means, a cam for actuating said pawl, and a spring drive connection between the rotatable member and the cam.

4. In a reverse drive mechanism, planetary speed reduction gearing including a freely mounted reaction gear having internal and external teeth, friction brake means operable to engage said gear and mounted for limited rotational movement in response to predetermined torque, a slidably mounted pawl for engaging the external teeth of the gear, and actuator means for the pawl including a spring, said actuator means being responsive to rotational movement of the friction brake means.

5. In a reverse drive mechanism, planetary gearing including a freely mounted reaction gear having internal and external teeth, a brake member shiftable axially to frictionally engage said gear, a positive brake pawl for engaging the external teeth of said gear, camming means for actuating said pawl, and a drive connection between said camming means and said brake member responsive to rotational movements of said brake member.

6. In a reverse drive mechanism having a casing, planetary gearing including a freely mounted reaction gear, an axially shiftable member for frictionally braking said gear and mounted for limited rotational movement in the casing, a pawl slidable in the casing for positively braking said gear, camming means for shifting the pawl including a rotatable member, spaced ears on the member, a pin extending across the space between the ears and fixed to the ears, and a yoke on the friction brake member straddling the pin and adapted to rotate said camming means member with the friction brake means, said ears being spaced to allow axial movement of the yoke therebetween within the range of axial movement of the friction brake member.

7. In a reverse drive mechanism, planetary gearing including a freely mounted reaction gear, an axially shiftable and rotatably mounted drum for frictionally braking said gear, spring means for opposing rotation of said drum, stop means limiting rotation of said drum, a shiftable positive brake means for said gear, and camming means responsive to rotation of said drum for actuating said positive brake means.

8. In a reverse drive mechanism, planetary gearing including a reaction gear having external teeth, a drum axially shiftable to frictionally brake said gear and mounted for limited relative movement, a slidable brake pawl having teeth for meshing with the external teeth of the gear, a member rotatable with the brake drum, a sleeve having cams for shifting said pawl, a coil spring connecting said rotatable member and said sleeve, and means on said rotatable member for positively rotating said sleeve therewith when rotated in a pawl disengaging relation, said means on said rotatable member being free to move relative to said sleeve when rotated in pawl engaging relation whereby said spring will wind up to further shift the pawl into mesh upon rotation of the gear in case the pawl teeth initially abut the gear teeth.

9. In a reverse drive mechanism, planetary gearing including a reaction gear having external teeth, a drum axially shiftable to frictionally brake said gear and mounted for limited relative movement, a slidable brake pawl having teeth for meshing with the external teeth of the gear, a member rotatable with the brake drum, a sleeve having cams for shifting said pawl, a coil spring connecting said rotatable member and said sleeve, said sleeve having slots in one end thereof, and legs on the rotatable member extending into the slots in said sleeve and freely movable therein while rotating in a direction to engage the pawl with the gear and engaging the sleeve to directly move the pawl from the gear when rotating in the other direction.

FOREST R. McFARLAND.

REFERENCES CITED

The following references are of record in the file of this patent:

UNITED STATES PATENTS

| Number | Name | Date |
|---|---|---|
| 1,702,479 | Mosch | Feb. 19, 1929 |
| 2,246,673 | Glasner | June 24, 1941 |
| 2,259,437 | Dean | Oct. 21, 1941 |
| 2,284,047 | Edwards | May 26, 1942 |
| 2,373,234 | Duffield | Apr. 10, 1945 |